Oct. 6, 1942.  G. F. MUDGETT  2,298,224
AUXILIARY LIGHTING DEVICE FOR RUNWAY MARKER LIGHTS
Filed Feb. 20, 1940
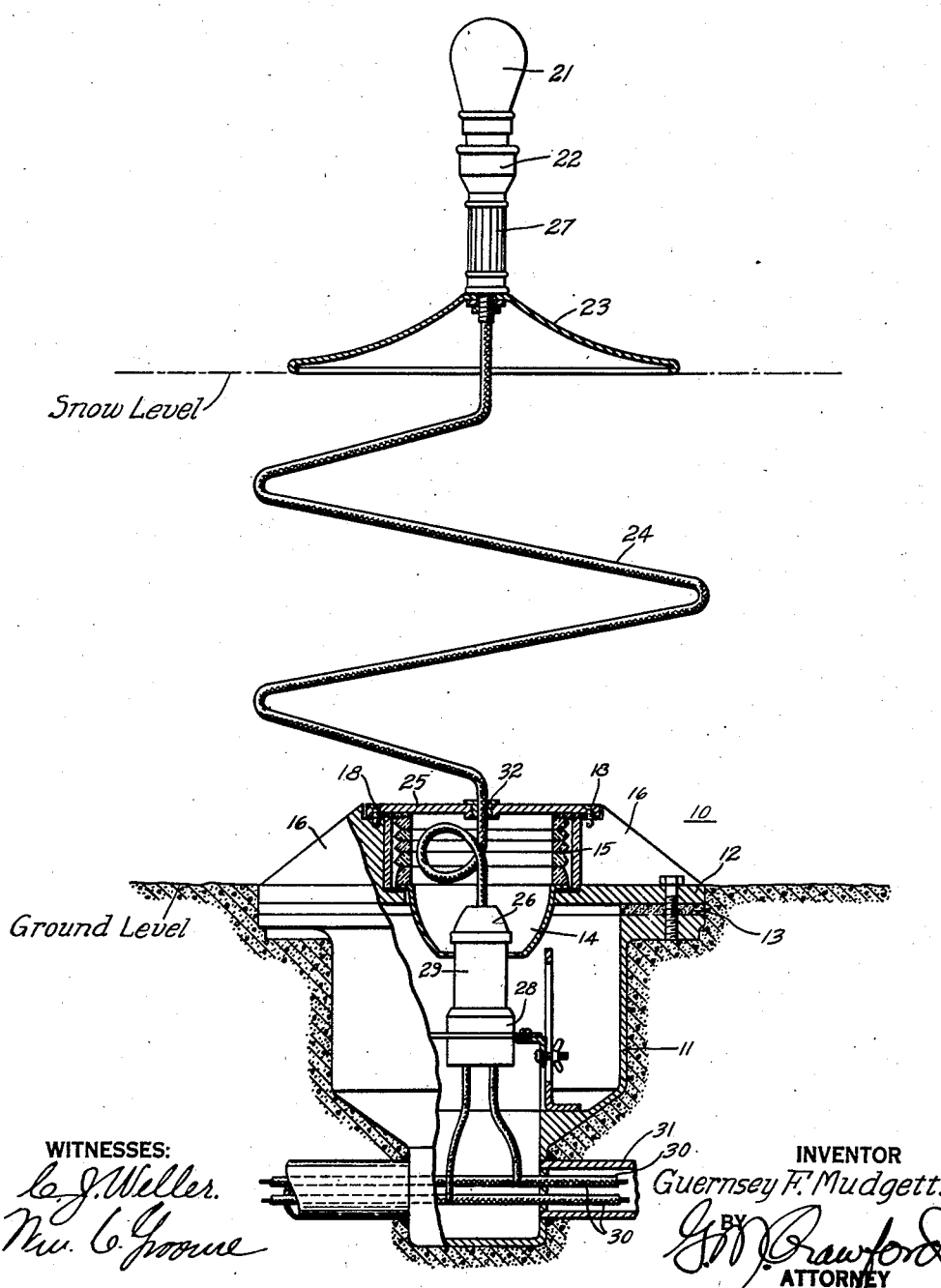
WITNESSES:
INVENTOR
Guernsey F. Mudgett.
BY
ATTORNEY / Patented Oct. 6, 1942

2,298,224

UNITED STATES PATENT OFFICE 2,298,224

AUXILIARY LIGHTING DEVICE FOR RUNWAY MARKER LIGHTS

Guernsey F. Mudgett, Hamilton, Ontario, Canada, assignor to Westinghouse Electric & Manufacturing Company, East Pittsburgh, Pa., a corporation of Pennsylvania Application February 20, 1940, Serial No. 319,882

3 Claims. (Cl. 240—1.2)

My invention relates, generally, to contact lights or runway marker lights for airports and, more particularly, to an auxiliary lighting device for use with lights of this character under weather conditions which render the contact light ineffective or seriously interfere with its operation.

During the past few years, runway marker lights of the semi-flush mounting type have come into general use. The lights comprise, generally, a main housing provided with a main cover member detachably secured thereto, the main cover member having a central opening through which the end of the lamp bulb extends, and a plurality of radially extending fins or guard members disposed around the opening. A prismatic lens or globe is supported from the main cover member to enclose the lamp bulb, and a removable cover plate is attached to the upper edges of the fins to close the upper end of the lens. The housing is embedded in the runway surface so that the lens is above the ground level, so as to provide for concentrating the light produced by the lamp in a vertically narrow zone extending at a slight angle to the horizontal or runway surface.

Since the top of a contact light installed in this manner extends only a few inches above ground level, it has been found that in localities where there is considerable snowfall, and snow storms occur quite frequently, these contact lights become covered with snow and ice to such extent as to partially or completely obstruct their light output, and the snow may become so deep and be deposited so often as to make it impossible or impractical to keep them uncovered at all times.

Since it is highly desirable that contact lights of this type be used as much of the time as possible and be effective at all times, it is to the problem of utilizing them under all weather conditions that the present invention is directed.

The object of my invention, generally stated, is to provide an auxiliary lighting device for use with contact lights which shall be of simple and economical construction, which may be readily installed, and which shall function as a supplemental light source to effectively mark a runway or landing area which is deeply covered by snow.

A more specific object of my invention is to provide for utilizing an auxiliary lighting device in conjunction with a runway marker or contact light of the type which is installed at ground level, or slightly above, for the purpose of providing a source of light during such times as the contact light is covered by snow in varying depths.

A further object of my invention is to provide an auxiliary lighting device of an extensible nature which may be connected to lamp socket or other electrical outlet of a runway marker or contact light, and which is provided with means for supporting the light source in the form of a lamp bulb on the surface of the snow covering the contact light.

Another object of the invention is to provide a runway marker or contact light for airports and landing areas so constructed and arranged that the light source thereof is flexibly and adjustably connected to the source of electric power that the light source may be readily maintained in a position above the top surface of the snow covering the runways or landing areas.

These and other objects of my invention will become more apparent from the following detailed description of a preferred embodiment of the invention when read in conjunction with the drawing, in which the single figure is a diagrammatic view of apparatus embodying my invention.

In practicing my invention in its preferred form, use is made of the marker light normally used, and to it is added an auxiliary lighting device when snow and ice conditions require or make it advisable, although it is to be understood that, if desired, the marker light may be so constructed for permanent use under such weather conditions as to make it impractical to use a marker light of the usual construction for any extended period of time throughout the year or period in which the lights are to be used.

The essential elements of a practical embodiment of the invention are a lamp, a weatherproof socket for the lamp, and a supporting base in the form of a flat disc or plate, or a shallow conical-shaped member preferably constructed of some durable and relatively lightweight material, attached to the socket for supporting it on the top surface of a snow blanket and a source of electric current for the lamp.

According to one embodiment of the invention, the runway marker light already installed is utilized to supply current to the auxiliary lamp, either by connecting the extension cord of the auxiliary device to the regular lamp socket therein or to a separate electrical outlet or connection therein. In this instance, the removable cover plate on the marker light is either replaced by one having a water-tight packing gland therein through which the extension cord extends, or the regular cover is provided with an opening of this character, and which is sealed or plugged under conditions of normal operation when the auxiliary device is not being used.

In this instance, the lamp socket, extension cord, replacement cover plate, and supporting base member for the socket may be assembled for ease in installation when needed, it only being necessary to remove the regular cover plate on the marker light, attach the cord to the socket or outlet therein, and attach the replacement cover plate.

Referring to the drawing, the numeral 10 designates a runway marker or contact light of the general nature with which the auxiliary lighting device of my invention is intended for use. The marker light is constructed in the form of a water-tight housing which is embedded in the surface of the runway or landing area, as shown. It comprises a main housing 11 having a main cover 12 secured thereto by means of a fluid-tight joint 13. The main cover 12 is provided with a central opening 14 through which the lamp normally extends to a point above ground level. A prismatic lens 15 is mounted on top of the cover member over the central opening in such manner as to normally enclose the end of the lamp bulb. The lens is protected by means of a plurality of radially extending fin members 16 on the cover member 12, and the housing is closed by means of a removable top cover plate attached to the fin members by means of screws 18. Under normal conditions, a marker light of this character functions to concentrate the light in a vertically narrow zone extending at a slight angle from the horizontal plane or surface of the runway.

It is apparent, however, that a unit of this kind is easily rendered ineffective or interfered with by heavy snowfall, and it is for the purpose of making it possible to use the unit under such conditions that the auxiliary lighting device of my invention has been provided.

The auxiliary lighting device may comprise, generally, a lamp 21, lamp socket 22, a supporting base 23, an extension cord or cable 24, an auxiliary or replacement cover plate 25, and a plug connector 26.

The lamp socket 22 is of water-tight or weatherproof construction, and is provided with a supporting stem 27 of any suitable height to maintain the lamp 21 at a sufficient distance above the snow level.

The supporting base member 23 may be of any suitable shape and constructed of any suitable material so long as it functions as a stable supporting base for the lamp socket and the lamp. It may be made in the form of a flat disc or plate or it may be generally dished as shown. It is preferably made of a material which is light in weight, weatherproof and durable.

In this instance, the marker light functions only as an outlet box for the auxiliary lighting device, the connector plug 26 being connected to the socket 28 of the unit through a suitable plug base 29. As shown, the socket 28 is connected to the supply conductors 30 which extend through the conduits 31 connecting a number of the marker lights along the edge of the runway or other area to be marked. In some instances, a transformer may be mounted within the housing 11 and the socket 28 connected directly thereto.

The replacement cover plate 25 is similar to the regular cover plates used on units of this kind, except that it is provided with a water-tight packing gland 32 through which the extension cord 24 extends. A separate cover plate may be used or the regular cover plate of the unit may be provided with a suitable opening through which the extension cord may be passed when it is desired to use the auxiliary lighting device, as shown. It is preferable, however, to make up the auxiliary lighting device in the form of a complete assembly wherein a separate cover plate is utilized which may be installed after removing the regular cover plate of the unit.

In view of the foregoing, it will be apparent that my invention provides for utilizing runway marker lights of the flush or semi-flush mounted type under all weather conditions, and particularly where there is a great amount of snowfall. The auxiliary lighting devices may be installed and utilized to effectively mark the runway or landing area regardless of the depth of the snow, since the supporting base on which the lamp is mounted makes it possible to at all times maintain the lamp above the snow level. This is advantageous in localities where heavy snowfalls are frequent and where the amount of snowfall is so great that it is impossible to remove it from the landing area.

Although I have described a specific embodiment of my invention, it will be apparent to those skilled in the art that various changes may be made in the details of construction, such as in the proportion and in the design of the several cooperating parts, without departing from the principles herein set forth.

I claim as my invention:

1. An auxiliary lighting device for use with airport contact lights having a lamp socket therein and a removable cover plate at the top comprising, a replacement cover plate having an opening therein, a flexible extension cord extending through the opening having a plug device at one end for attachment to the lamp socket in the contact light, a water-proof lamp socket attached to the other end of the cord, and a relatively flat base member attached to the socket for supporting it on the surface of a snow blanket.

2. An auxiliary lighting device for use with airport marker lights of the flush or semi-flush mounted type having an electrical power outlet therein and a top opening normally covered by means of a detachable cover plate comprising, a flexible extension cord having attaching means at one end for electrically connecting it to the outlet of the marker light, a replaceable cover plate having an opening therein through which the extension cord extends, means for sealing said opening against the entrance of moisture, a weather-proof lamp socket attached to the opposite end of the cord, and a pan-shaped base member for supporting the socket in an upright position on the top surface of a snow blanket covering the marker light.

3. An auxiliary lighting device for use with airport contact lights of the type which are embedded in the surface of the landing area and which are provided with an electrical outlet therein and a removable cover plate comprising an auxiliary cover plate to replace the regular cover plate of the contact light, said auxiliary cover plate having a bushed opening therein to receive a flexible extension cord, a flexible extension cord extending through the bushed opening and having means at one end to attach it to the electrical outlet in the contact light, an elongated weatherproof socket attached to the other end of the cord for supporting and conducting current to a lamp, and a relatively flat and lightweight base member attached to the elongated socket for supporting it and the lamp in an upright position above the surface of a snow blanket.

GUERNSEY F. MUDGETT.